(12) United States Patent
Lin

(10) Patent No.: US 7,209,195 B2
(45) Date of Patent: Apr. 24, 2007

(54) LIQUID CRYSTAL DISPLAY MODULE AND FASTENING STRUCTURE THEREOF

(75) Inventor: Mei-Hui Lin, Yunghe (TW)

(73) Assignee: Hannstar Display Corporation, Hsinchu (TW)

( * ) Notice: Subject to any disclaimer, the term of this patent is extended or adjusted under 35 U.S.C. 154(b) by 9 days.

(21) Appl. No.: 10/702,784

(22) Filed: Nov. 5, 2003

(65) Prior Publication Data

US 2004/0141102 A1    Jul. 22, 2004

(30) Foreign Application Priority Data

Jan. 8, 2003  (TW) ............................... 92200336 U
Apr. 21, 2003  (TW) ............................... 92206310 U

(51) Int. Cl.
*G02F 1/1333*  (2006.01)
(52) U.S. Cl. ........................................................ 349/58
(58) Field of Classification Search ................... 349/58
See application file for complete search history.

(56) References Cited

U.S. PATENT DOCUMENTS 6,507,377 B1 *  1/2003  Jung ............................ 349/60

\* cited by examiner

*Primary Examiner*—David Nelms
*Assistant Examiner*—Richard H Kim
(74) *Attorney, Agent, or Firm*—Seyfarth Shaw LLP

(57) ABSTRACT

A LCD module comprises a LCD cell, a back light module and a pair of fastening structure including the first frame and the second frame, both capable of joining one with the other. The first frame, which can support the back light module, has a first locking mechanism on its edge, and the second frame, which is around the side of the display area of the LCD cell, has a second locking mechanism adjacent to its edge. By the combination the first locking mechanism and the second locking mechanism, the LCD cell and the back light module can be fastened together.

20 Claims, 12 Drawing Sheets

LIQUID CRYSTAL DISPLAY MODULE AND FASTENING STRUCTURE THEREOF

BACKGROUND OF THE INVENTION

1. Field of the Invention

The present invention relates to a liquid crystal display (LCD) module and fastening structure thereof, and more particularly to a fastening structure capable of assembling a LCD cell and a back light module together and firmly fixing them.

2. Description of the Related Art

LCD modules have widely been applied in the monitors of computers, especially notebook computers, which specially need thin, light and low-power displays. Hence, this obviously shows the LCD modules are so important that they cannot be replaced. With the aim to reduce the thickness for assembling the LCD modules, the side-mounting technology is proposed in the specification of the U.S. Pat. No. 6,373,537 (hereafter known as Patent '537) entitled "Computer Having Liquid Crystal Display between Frames Attached at the Edges" to meet the need of thinning of the LCD modules.

FIG. 1 is an explosive diagram of the assembling components of the LCD module 10 disclosed in the Patent '537. A back light module 13 and a LCD cell 14 are superimposed on a first frame 11 sequentially, and a second frame 12 is set around the LCD cell 14. A plurality of through holes 121 are on the lateral surfaces of the second frame 12. The second frame 12 is mounted to the first frame 11 using screws 60 through the through holes 121 and screw holes 111 on the first frame 11. Comparing the Patent '537 with the prior art in which the side frame of the second frame is vertically mounted to the first frame by a screw from the front (display area) of the second frame 12, the Patent '537 can definitely reduce the size of the fastening structure.

However, a screwdriver is required to fix the first frame 11 and the second frame 12 together by a screw 60 for assembling the LCD module 10 disclosed in the Patent '537. In this way, there takes a lot of efforts and time to complete screwdriver jobs for all screws 60, and then get the combination of FIG. 1 as shown in FIG. 2 respectively. Moreover, the screws get stripped readily during assembling, making rework very hard.

SUMMARY OF THE INVENTION

An objective of the present invention is to provide an LCD module and fastening structure thereof, wherein a pair of locking mechanisms is installed on the edge of the first frame and the second frame and can be used for joining them together. Hence, it can provide a fastening structure for assembling the frames conveniently so as to reduce the work required for assembling them, thereby reducing the working time. Moreover, during the assembly process, no tools are required for assembling.

In order to achieve the objective, the present invention discloses an LCD module and fastening structure thereof. The LCD module comprises a LCD cell, a back light module and a pair of fastening structure including the first frame and the second frame, both capable of joining one with the other. The first frame, which can support the back light module, has a first locking mechanism on its edge, and the second frame, which is around the side of the display area of the LCD cell, has a second locking mechanism adjacent to its edge. By the combination the first locking mechanism and the second locking mechanism, the LCD cell and the back light module can be fastened together.

BRIEF DESCRIPTION OF THE DRAWINGS

The invention will be described according to the appended drawings in which.

PREFERRED EMBODIMENT OF THE PRESENT INVENTION

Figure 1:
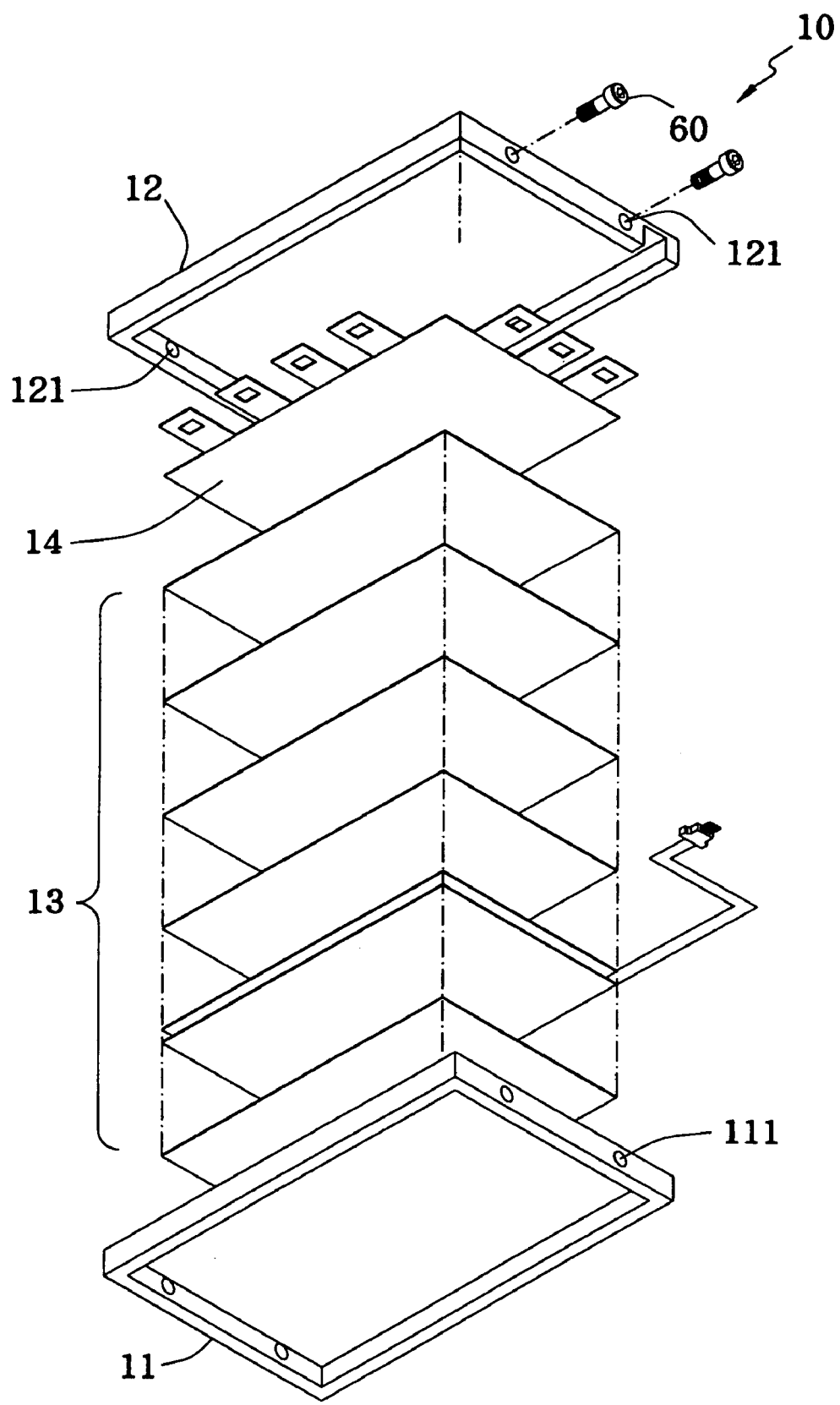
FIG. 1 is an explosive diagram of the assembling components of a LCD module disclosed in the Patent '537.
Figure 2:
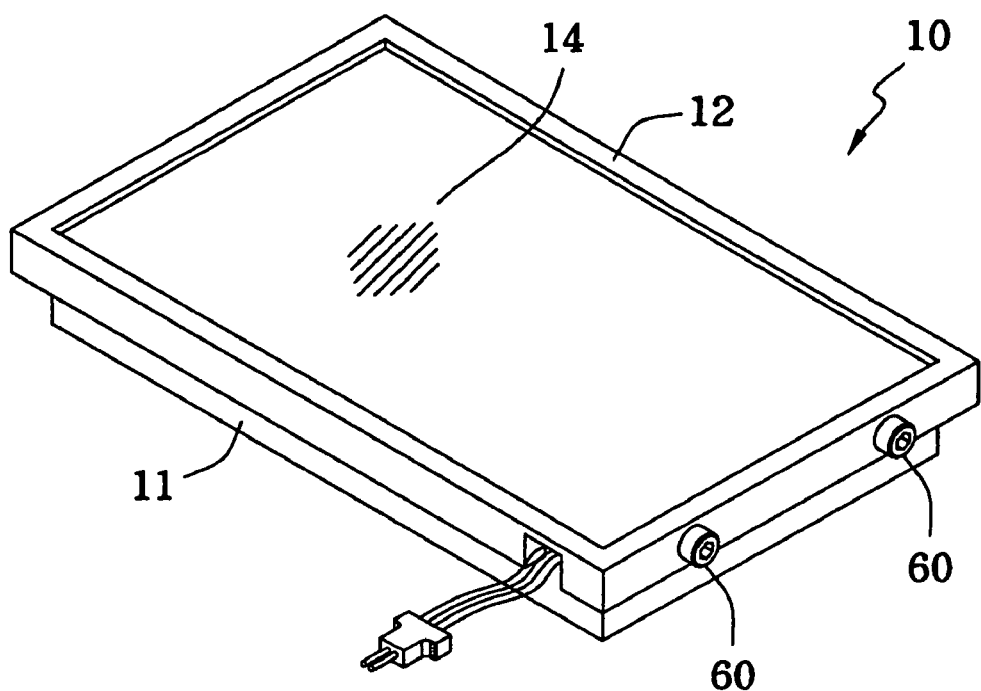
FIG. 2 is a perspective diagram of the assembly of the LCD module in FIG. 1.
Figure 3A:
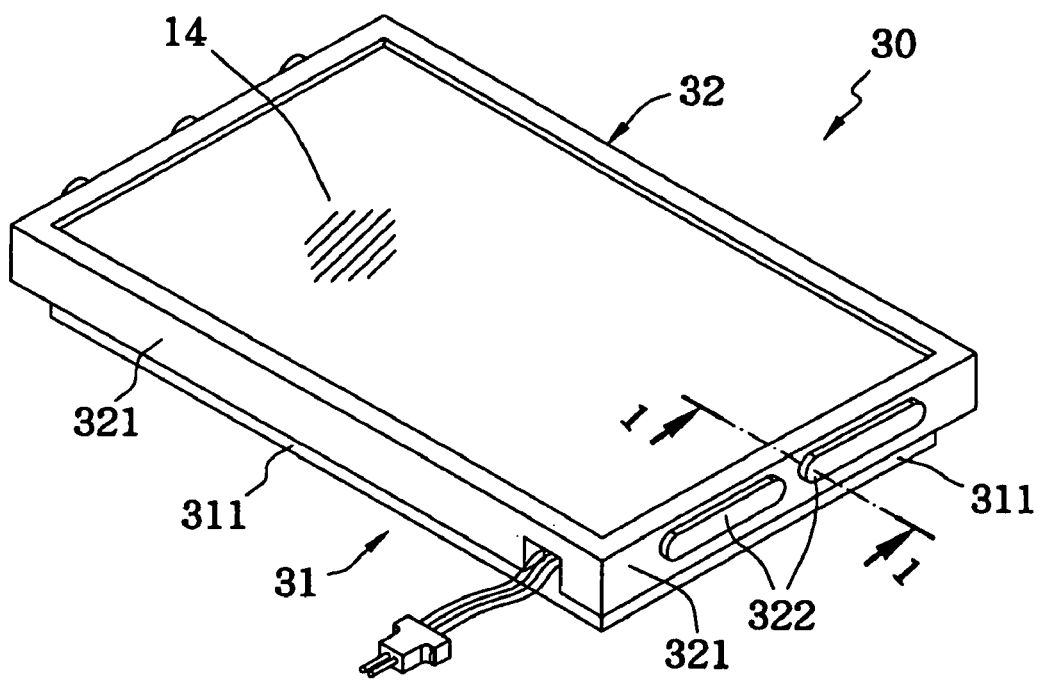
FIGS. 3(a)–3(g) are perspective diagrams and cross-section diagrams of the first embodiment of the LCD module in accordance with the present invention.

FIG. 3(a) is a perspective diagram of the first embodiment of the LCD module 30 in accordance with the present invention. The side 321 of a second frame 32 covers the side 311 of a first frame 31. A pair of locking mechanisms formed on the two sides 321 and 311 respectively is used to join the second frame 32 and the first frame 31 closely together. The pair of locking mechanisms can fasten the frames 31, 32 and the LCD cell 14 together by engaging the protrusion of one frame with the hollow of another frame, without the need to use the other fastening parts, such as screws and bolts.

Figure 3B:
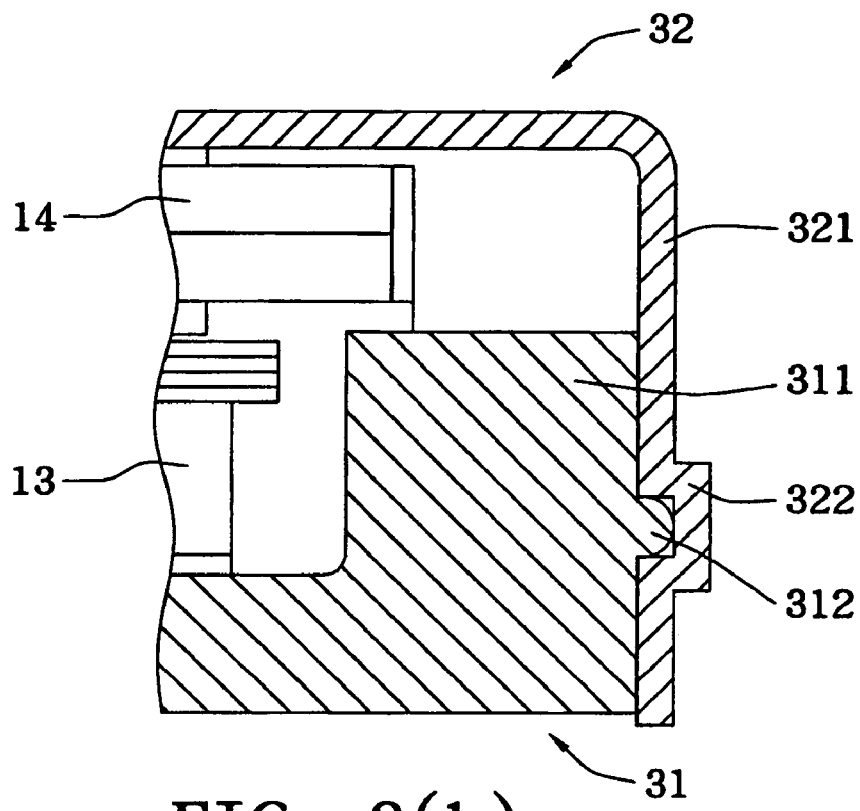

FIG. 3(b) is a cross-section diagram along the line 1—1 of the LCD module 30 in FIG. 3(a). The first frame 31 supports the base of a back light module 13 with its four sides 311 extending upward the LCD cell 14 is superimposed on the back light module 13. First locking mechanisms 312 as protrusions are formed on the sides 311 of the first frame 31, and are interlocked with the second locking mechanisms 322 as hollows formed on the second frame 32. In this way, the back light module 13 and the LCD cell 14 can be fixed between the first frame 31 and the second frame 32. The first locking mechanism 312 can be a cylinder or a sphere bump. This shape depends on the tolerances of the first frame 31 and the second frame 32, as well as the location distribution and the quantity of the first locking mechanisms 312 and the second locking mechanisms 322.

Figure 3C:
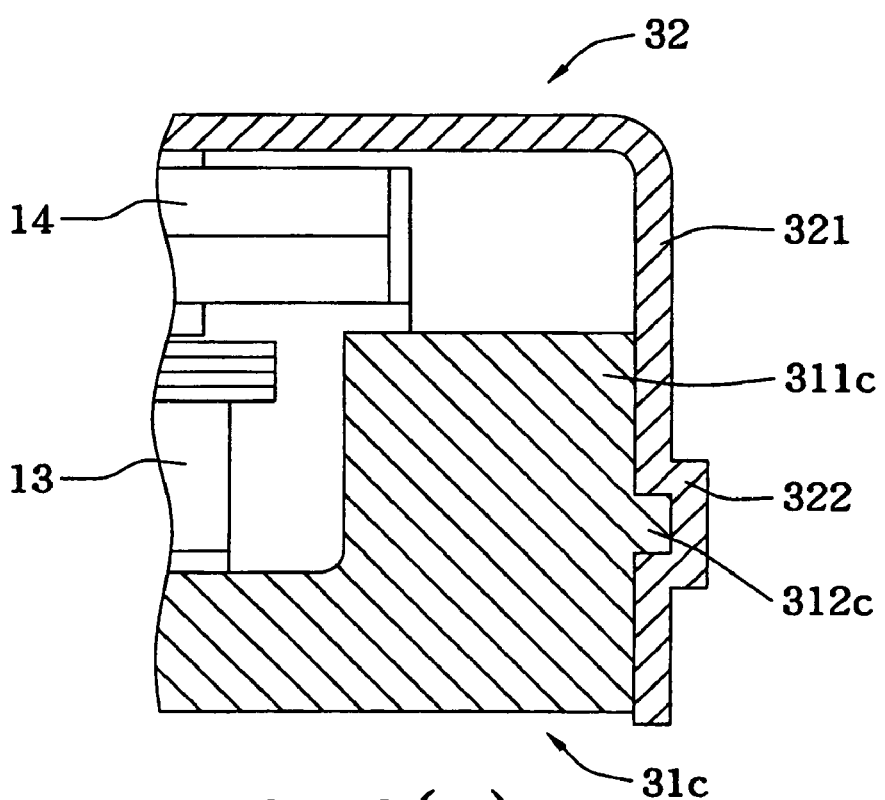

In general, the above-mentioned frames are made of two types of materials, namely metals and plastics. Metallic frames can be formed by stamping stainless steel, aluminum, or galvanized steel plates, and plastic frames can be formed by injecting plastic materials, such as PC (Polycarbonate) and ABS (Acrylonitrile Butadiene Styrene), into a injection mold. Hence, it is possible to rearrange the interlocking way of the first locking mechanism 312 and the second locking mechanism 322 by changing the design of the stamping or injection molds. As shown in FIG. 3(c), a rectangular first locking mechanism 312c is provided on the side 311c of the first frame 31c so that the first locking mechanism 312c is completely interlocked inside the hollow-shaped second locking mechanism 322.

Figure 3D:
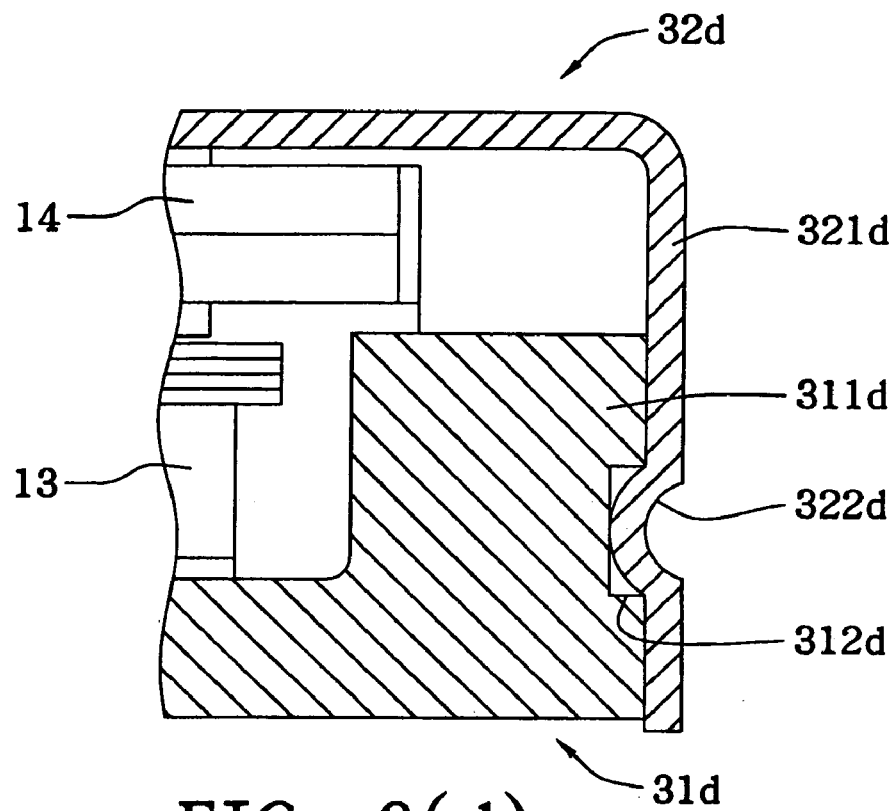

As shown in FIG. 3(d), it is also possible to design the first locking mechanism 312d on the side 311d of the first frame 31d as a hollow. Accordingly, the second locking mechanism 322d on the side 321d of the second frame 32d is as an inward spherical-shaped or cylindrical-shaped bump.

Figure 3E:
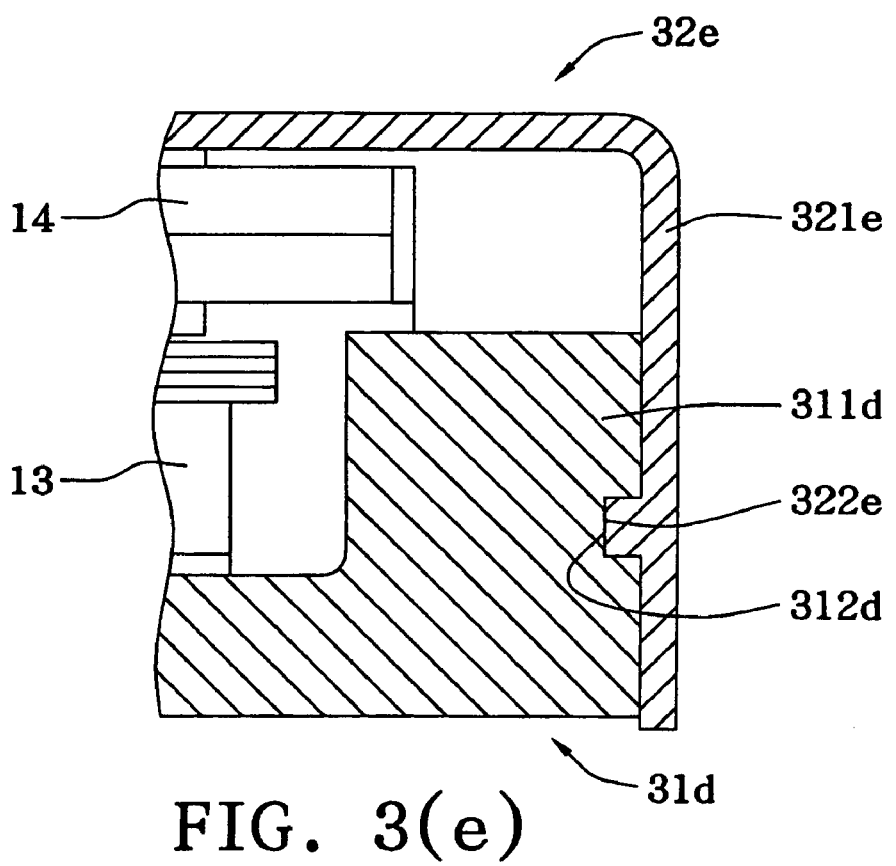

As shown in FIG. 3(e), it is also possible to design the first locking mechanism 312d on the side 311d of the first frame 31d as a hollow. Accordingly, the second locking mechanism 322e on the side 321e of the second frame 32e can be an inward rectangular-shaped bump.

Figure 3F:
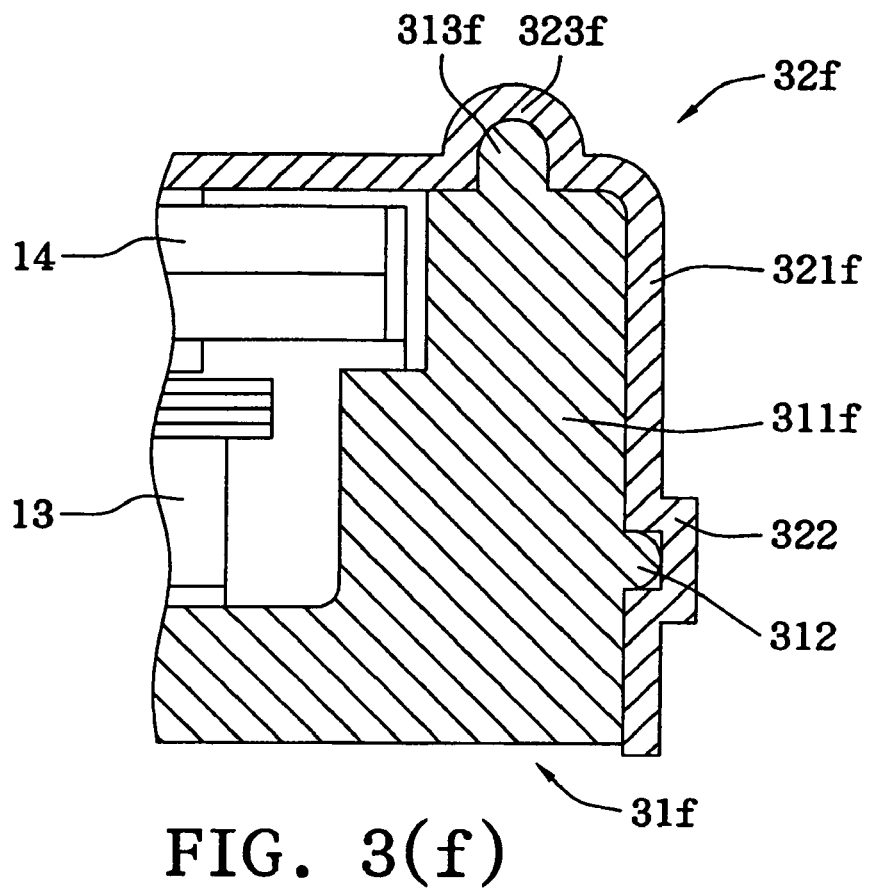
Figure 3G:
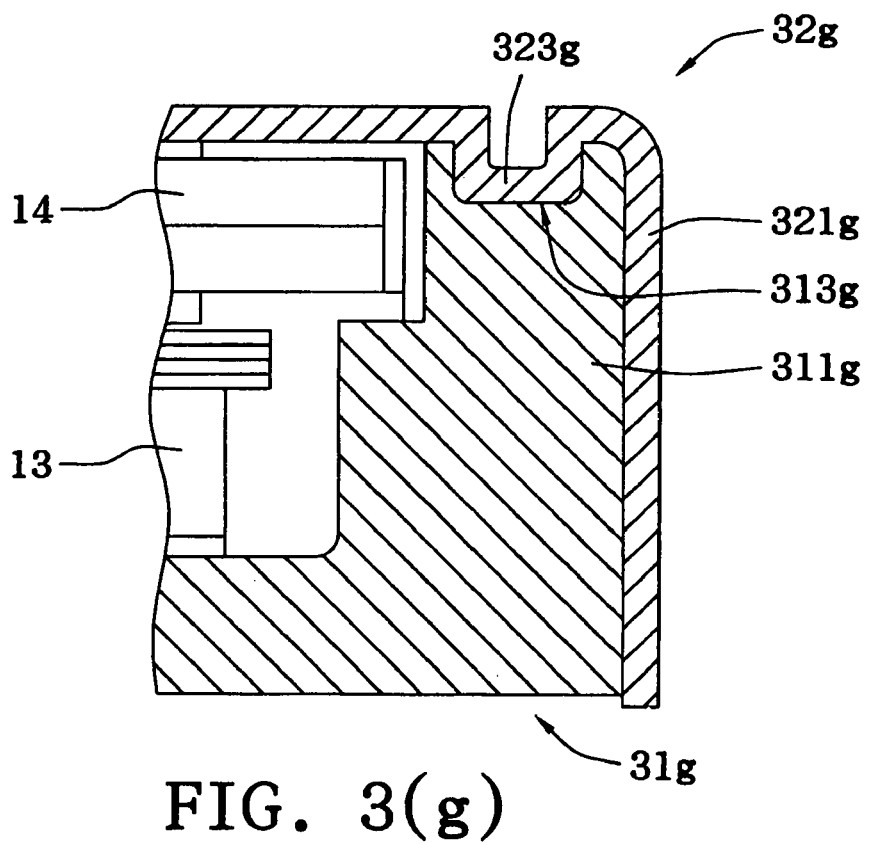

Furthermore, we can provide a first locking mechanism 313f on the upper side of an edge 311f and a second locking mechanism 323f adjacent to the edge 321f, as shown in FIG. 3(f). In comparison with FIG. 3(b), besides the first locking mechanism 313f is interlocked with the second locking mechanism 323f in the parallel direction of the lateral of the edge 311f, a first locking mechanism 312 is also interlocked with the second locking mechanism 322 in the vertical direction of the lateral of the edge 311f. Therefore, the first frame 31f and the second frame 32f can be firmly joined together.

Similarly, a first locking mechanism 313g and a second locking mechanism 323g are dividedly provided on the upper side of an edge 311g and around the edge 321g. The first frame 31g and the second frame 32g also can be firmly joined together by one pair of locking mechanisms, if the second locking mechanism 323g is inserted into the first locking mechanism 313g without any tolerance.

Figure 4A:
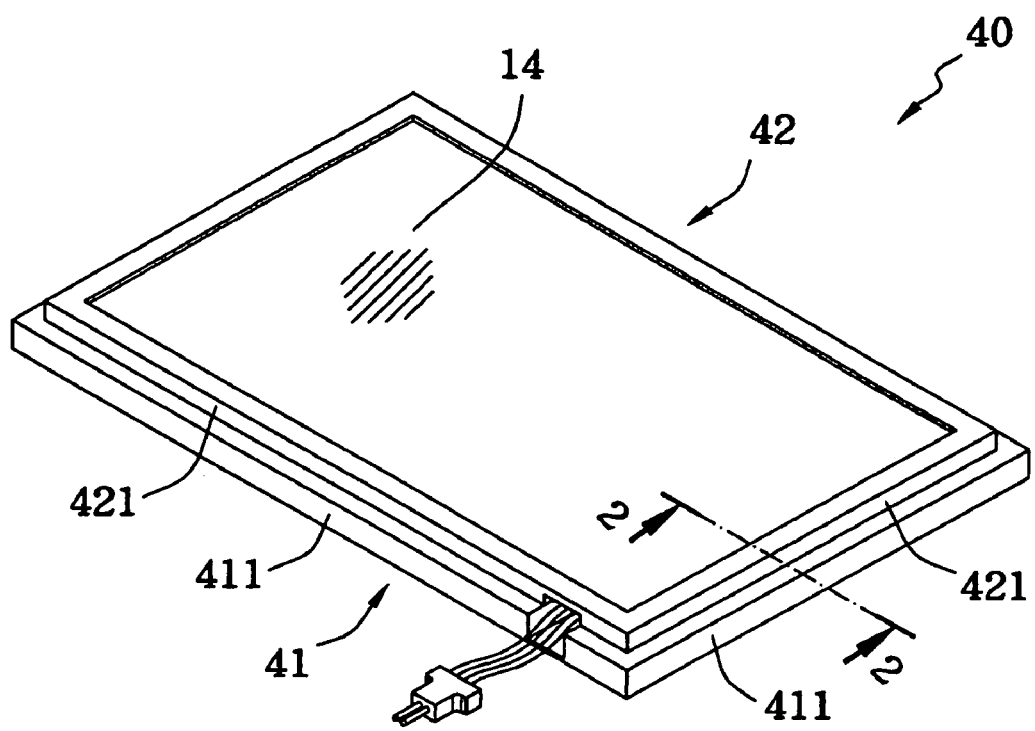
FIGS. 4(a)–4(f) are perspective diagrams and cross-section diagrams of the second embodiment of the LCD module in accordance with the present invention.

FIG. 4(a) is a perspective diagram of the second embodiment of the LCD module 40 in accordance with the present invention. The side 421 of the second frame 42 is inserted into the sidewall 411 of the first frame 41, and the LCD cell 14 is between the frames 41 and 42. The second frame 42 is closely joined to the first frame 41 by means of the locking units installed on the side 421 and the sidewall 411 respectively.

Figure 4B:
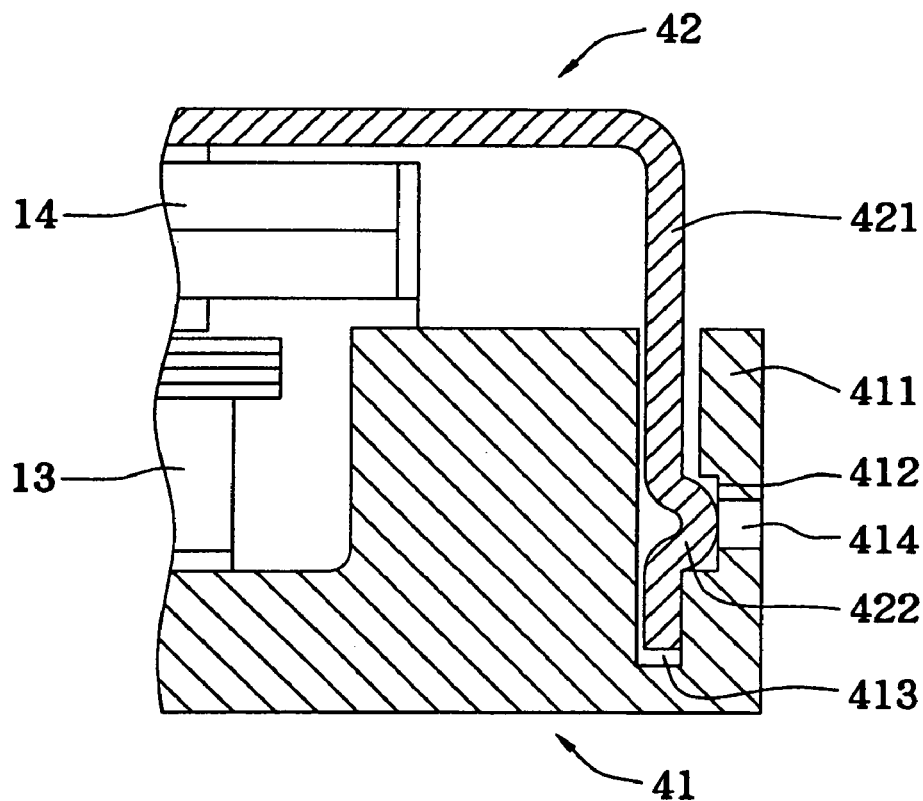

FIG. 4(b) is a cross-section diagram along the line 2—2 of the LCD module 40 in FIG. 4(a). The first frame 41 supports the base of the back light module 13 with its four sidewalls 411 extending upward to the bottom edge of a LCD cell 14. The LCD cell 14 is superimposed on the back light module 13. The sidewall 411 of the first frame 41 has a slot 413 into which the side 421 of the second frame 42 is inserted. The slot 413 is equipped with the first locking mechanism, the concave hollow, 412 and can allow of the insertion of the second locking mechanism, the convex bump, 422 on the side 421 of the second frame 42. In order to ensure that the second frame 42 and the first frame 41 can be separated during a later rework process, it is necessary to make a through hole 414 on the side wall 411, just put a pin-like hand tool deep into the through hole 414 and then lightly press the second locking mechanism 422 so as to lift the second frame 42 vertically.

Figure 4C:
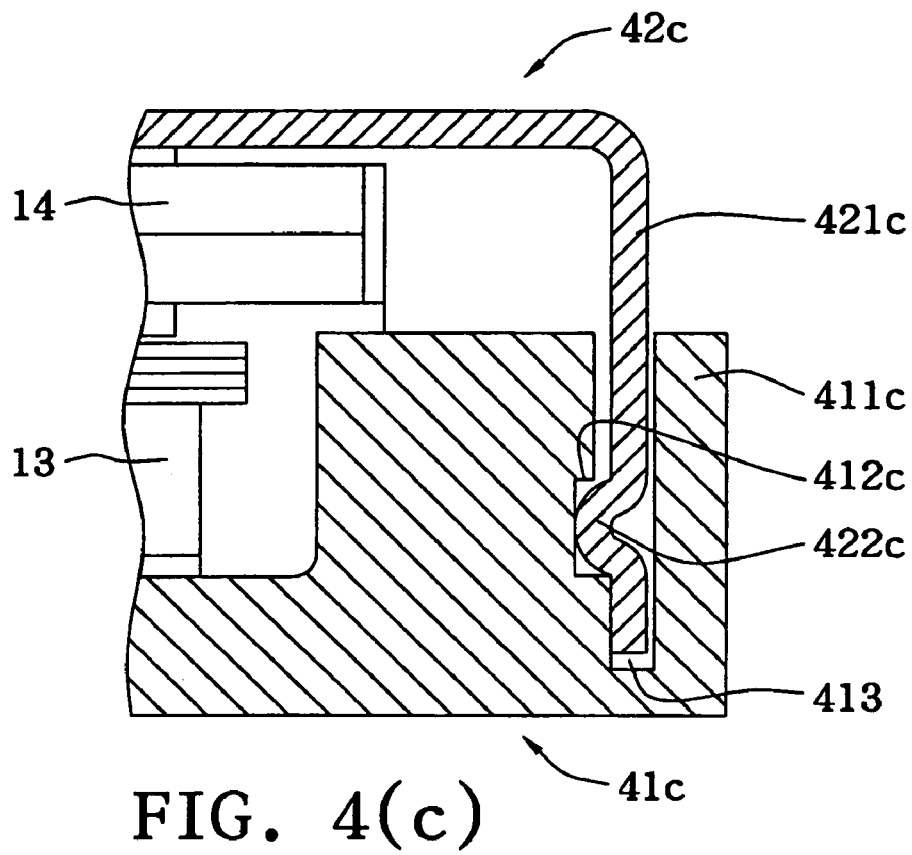

In contrast to FIG. 4(b), FIG. 4(c) shows that the second locking mechanism 422c on the side 421c of the second frame 42c is turned into an inward-convex bump, and the first locking mechanism, the inward-concave hollow, 412c associated with the inward-convex bump has to be provided in a slot 413. Hence, the side 421c of the second frame 42c can be completely embedded and fixed in the sidewall 411c of the first frame 41c.

Figure 4D:
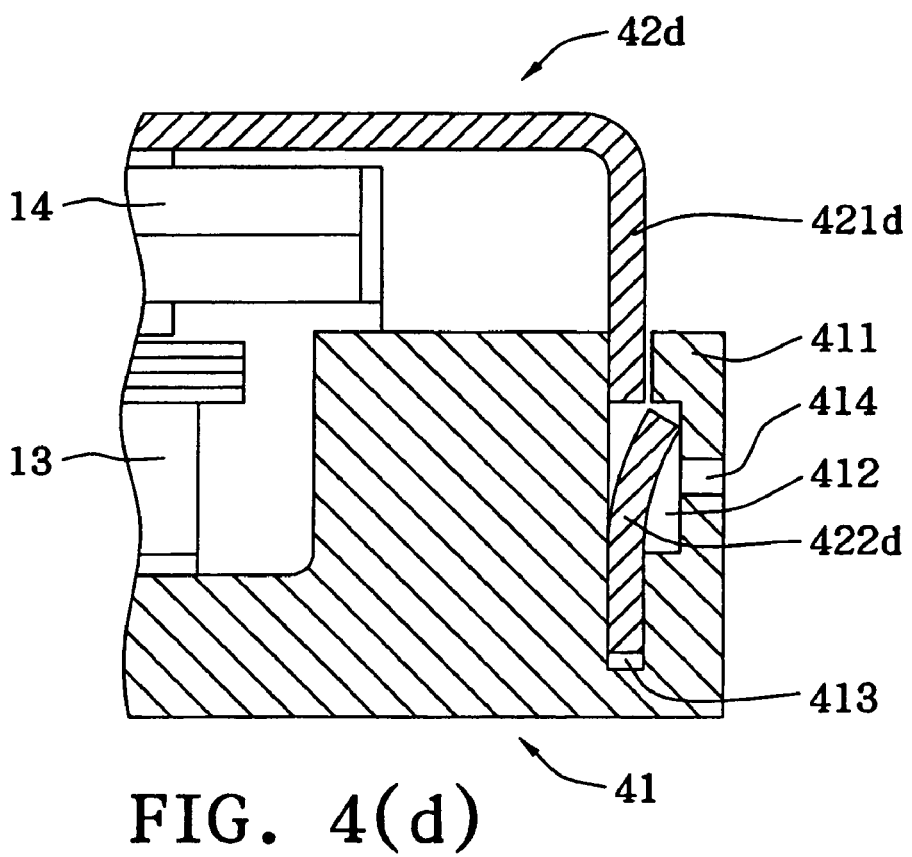

In addition, FIG. 4(d) shows that the present invention can make good use of stamping, a good property of metals in forming. A bent and convex second locking mechanism 422d is formed on the side 421d of a second frame 42d. The second locking mechanism 422d is interlocked with the concave first locking mechanism, the concave hollow, 412 inside the slot 413 of a sidewall 411 of the first frame 41, and the elasticity of the second locking mechanism 422d is conducive to locking the second locking mechanism 422d and the first locking mechanism 412 tightly. In this way, the side 421d of the second frame 42d can be completely embedded and fixed in the sidewall 411 of the first frame 41. On the other hand, in order to ensure that the second frame 42d and first frame 41 can be separated in a future, it is necessary to make a through hole 414 on the side wall 411, just put a pin-like hand tool deep into the through hole 414 and then lightly press the bent part of the second locking mechanism 422d so as to lift the second frame 42d vertically.

Figure 4E:
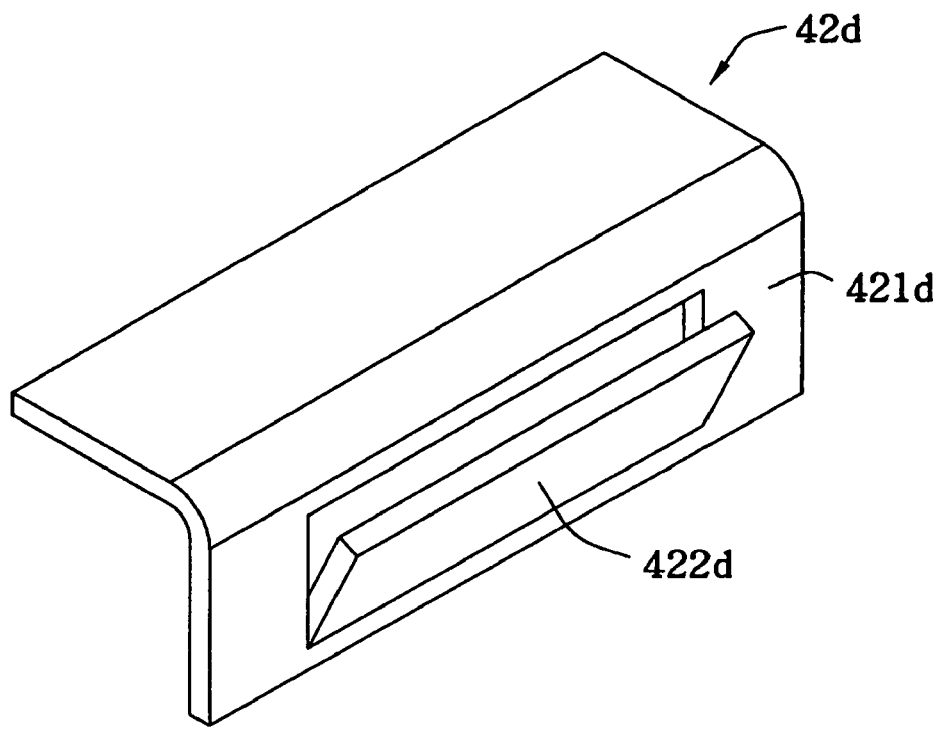

FIG. 4(e) is a perspective diagram of the second locking mechanism in FIG. 4(d). Cut three sides of a rectangle on the plate of the side 421d and then form the second locking mechanism by bending outward against the uncut base edge as a fulcrum.

Figure 4F:
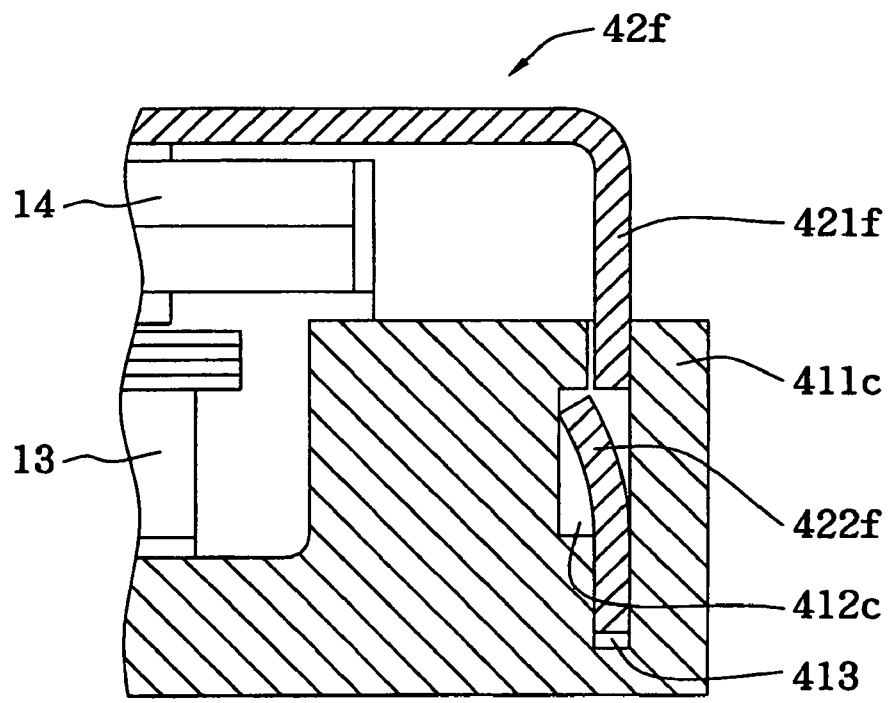

In contrast to FIG. 4(d), FIG. 4(f) shows that the second locking mechanism 422f on a side 421f of the second frame 42f is turned into an inward-convex bend so that a first locking mechanism, the inward-concave hollow, 412c inside the slot 413c of a sidewall 411c of the first frame 41c associated with the inwardly convex bend has to be provided on the left inner wall of the slot 413. Hence, the side 421f of the second frame 42f can be completely embedded and fixed in the sidewall 411c of the first frame 41c. Although the above-mentioned discloses that the shapes of the second locking mechanism 422d and 422f are like an convex bend and an inward-convex bend, respectively, this does not restrict the scope of the present invention, because the same locking effect may be achieved if the second is locking mechanisms 422d and 422f look like a herringbone or other like mechanisms.

Figure 5A:
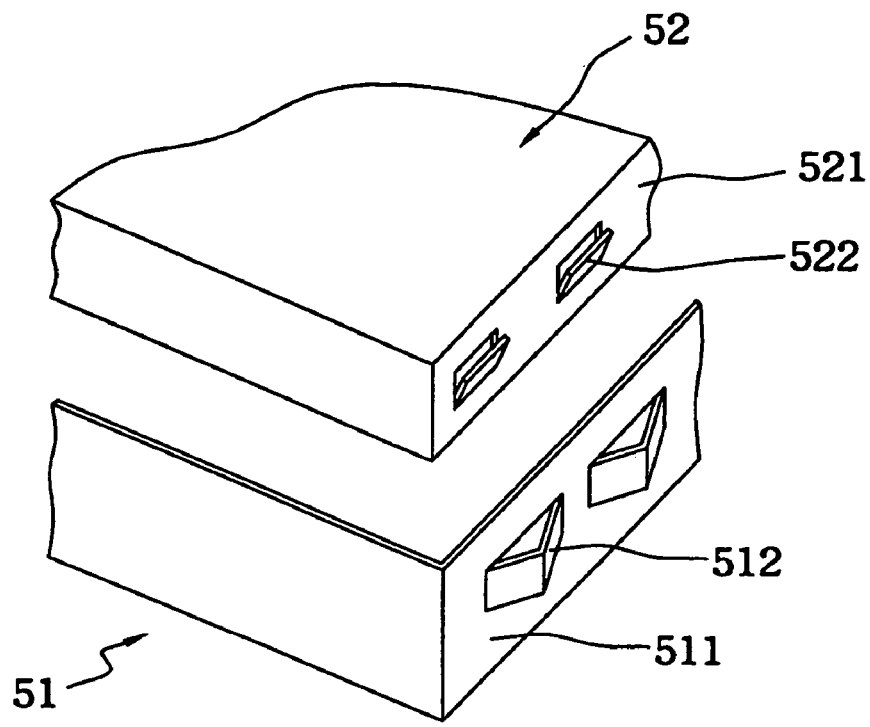
FIGS. 5(a)–5(c) are perspective diagrams and cross-section diagrams of the third embodiment of the LCD module in accordance with the present invention.
Figure 5B:
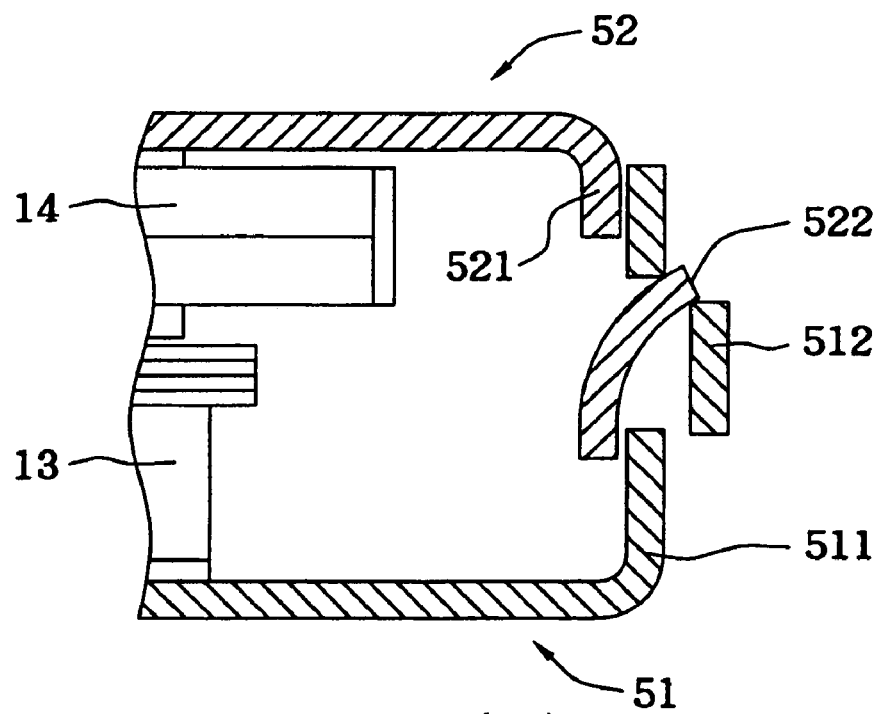

FIG. 5(a) is a perspective diagram of the third embodiment of the LCD module in accordance with the present invention. The side 521 of a second frame 52 has a plurality of convex bends 522 which can be embedded in the concave hole 512 of the sidewall 511 of the first frame 51. The formation of the convex bend 522 is the same as the method disclosed in FIG. 4(e), and the concave hole 512 is a convex locking mechanism stamped and formed on the plate of the sidewall 511. As shown in FIG. 5(b), when the second frame 52 is joined with the first frame 51, an the convex bend 522 will be locked inside the concave hole 512 accordingly and even clipped in a cleavage, thereby causing a better fixing effect. On the other hand, we can also bend bent springs toward the LCD cell 14 and have corresponding concave holes.

Figure 5C:
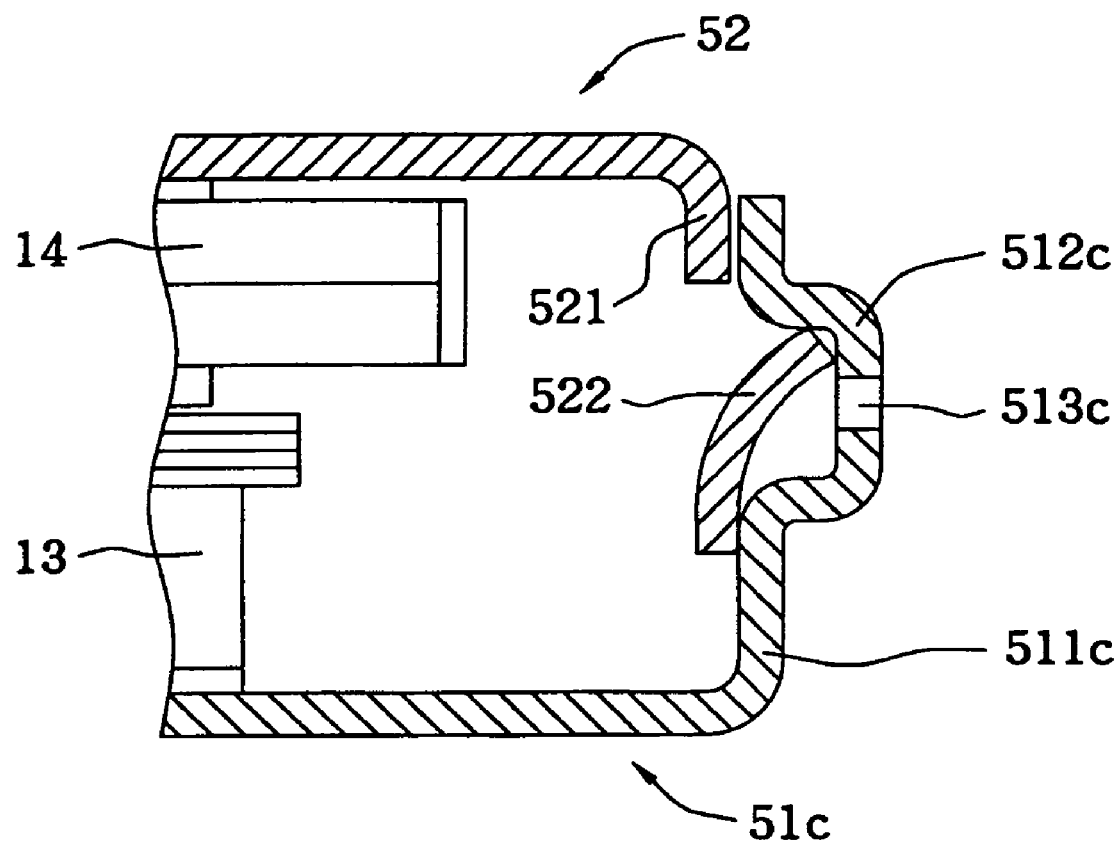

In contrast to FIG. 5(b), FIG. 5(c) shows that a groove 512c of the sidewall 511c of the first frame 51c does not have any cleavage, but the convex bend 522 can be against on the inner surface of the groove 512c. In order to ensure that the second frame 52 and first frame 51c can be separated after interlocking with each other, it is necessary to make a through hole 513c on the base of the groove 512c, just put a pin-like hand tool deep into the through hole 513c and turn the convex bend 522 to a adequate position so as to lift the second frame 52 upwardly. On the other hand, we can also bend bent springs toward the LCD cell 14 and have corresponding grooves and through holes.

Figure 6A:
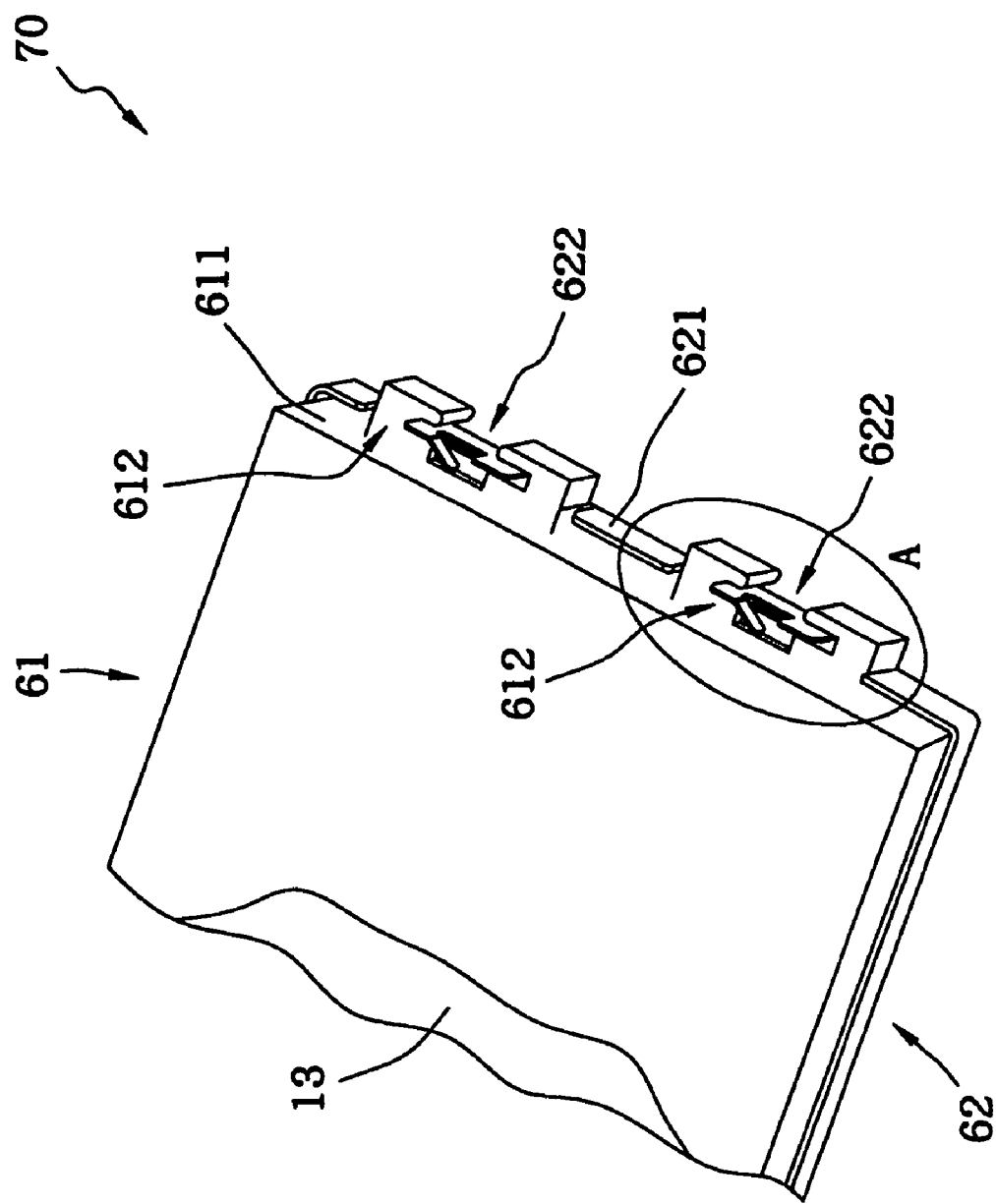
FIGS. 6(a)–6(b) are perspective diagrams and cross-section diagrams of the fourth embodiment of the LCD module in accordance with the present invention.

To ensure that a first frame 61 is joined to a second frame 62 more tightly, the present invention further proposes the fourth embodiment of the LCD module 70, as shown in FIG. 6(a) a perspective diagram. The sidewall 611 of the first frame 61 is equipped with a first locking mechanism 612 and the side 621 of a second frame 62 is correspondingly equipped with a second locking mechanism 622. By interlocking the first locking mechanism 612 and the second locking mechanism 622, the first frame 61 and the second frame 62 can be completely positioned. In other words, clearance remaining parallel to or vertical to the base of the back light module 13 can be removed.

Figure 6B:
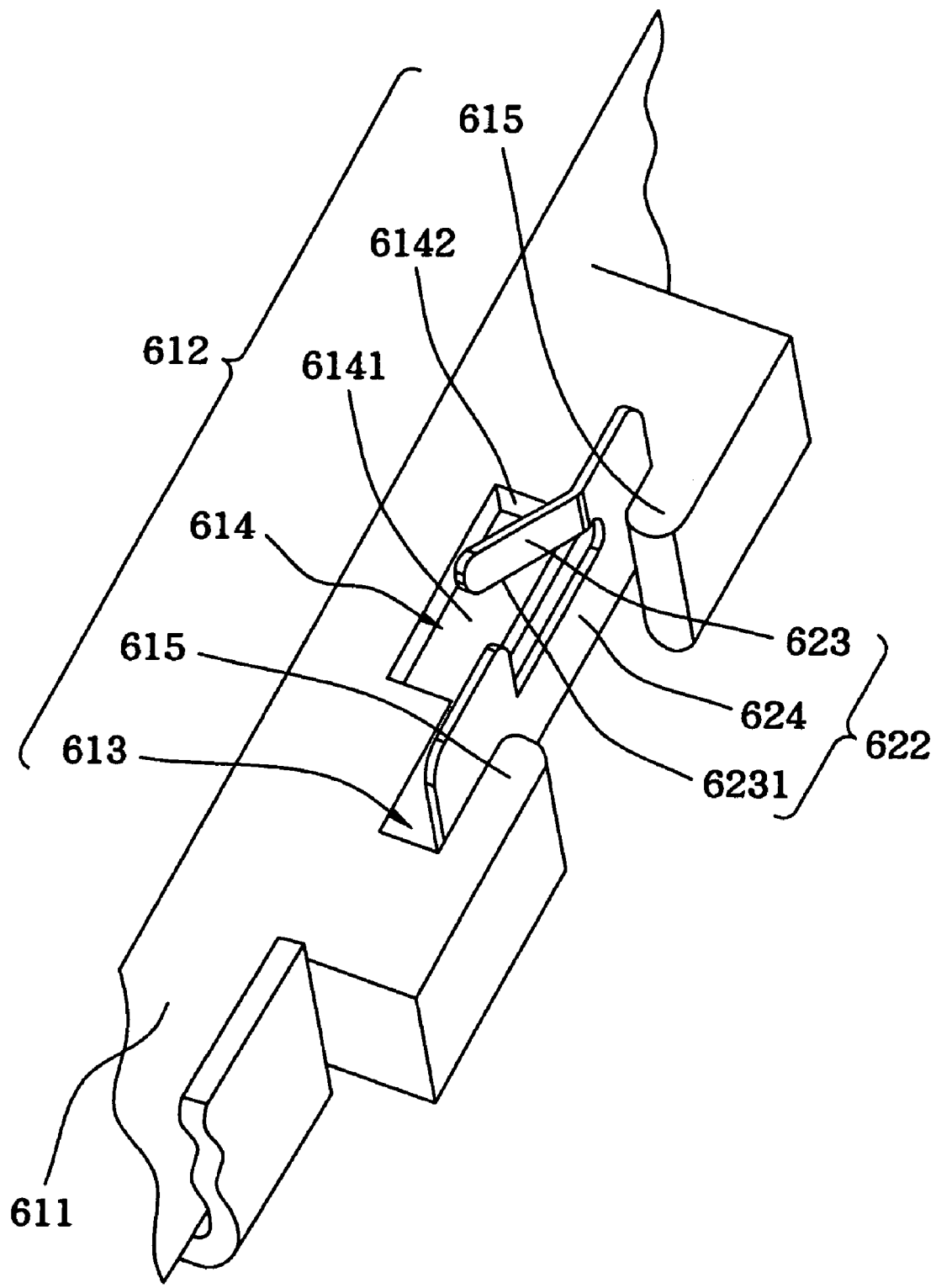

FIG. 6(*b*) is an enlarging diagram of the portion A in FIG. 6(*a*). A first locking mechanism 612 includes a holding part 615 convexly provided on a sidewall 611. The middle of the holding part 615 has a long slot 613 that allows a second locking mechanism 622 to through it from below. The second bent part 623 of the second locking mechanism 622 extends beyond the long slot 613 and the plasticity of its material enables it to bend toward a thin concave 614 so as to constrain its vertical displacement in the upward and the downward direction. As the surface of the first bent part 624 of the second locking mechanism 622 is against at the sidewall of the long slot 613 and the first bent part 624 is as long as the long slot 613 approximately, the long slot 613 exactly constrains the relative horizontal displacement (parallel to the base of the back light module 13, and not shown here) of the second locking mechanism 622 in forward, backward, leftward, and rightward directions. As shown in FIG. 6(*b*), the holding part 615 has a left and a right portion apart from each other, but the two portions also can be made as one.

On the other hand, the second bent part 623 adjacent to the sidewall 6142 of the thin concave 614 is bent inwardly. The base 6231 of the second bent part 623 and the base 6141 of the thin concave 614 presses against each other, eliminating any vertical clearance (perpendicular to the base of the back light module 13, and not shown here) between the first frame 61 and the second frame 62.

To separate the first frame 61 and the second frame 62, it is only necessary to straighten the second bent part 623 in the direction of the holding part 615. In this way, the second locking mechanism 622 can be extracted from the long slot 613. It is better to have the second frame 62 formed by stamping and cutting metallic plates. Plasticity and elasticity of metallic materials can be employed to achieve the best fixing effect.

The above-described embodiments of the present invention are intended to be illustrative only. Numerous alternative embodiments may be devised by persons skilled in the art without departing from the scope of the following claims.

What is claimed is:

1. A liquid crystal display, comprising:
   a liquid crystal display cell;
   a back light module joined with the liquid crystal display cell;
   a first frame holding the back light module and comprising at least one first locking mechanism including a holding part with an opening extending therethrough; and
   a second frame comprising a main frame overlaid on the liquid crystal display cell and at least one L-shaped assist fixing member extending from the main frame and bent toward the holding part;
   wherein the L-shaped assist fixing member is disposable through the opening to be held by the holding part.

2. The liquid crystal display of claim 1, wherein the L-shaped assist fixing member is an extension portion of the main frame.

3. The liquid crystal display of claim 1, wherein the first locking mechanism further comprises a recess.

4. The liquid crystal display of claim 3, wherein the L-shaped assist fixing member further comprises a first bent part which is through the opening and extends from the main frame and a second bent part which is against the recess and extends from the first bent part.

5. The liquid crystal display of claim 4, wherein the second bent part and the main frame are respectively at opposite external sides of the opening.

6. The liquid crystal display of claim 1, wherein the second frame further comprises at least one sidewall extending from the main frame and surrounding the first frame.

7. The liquid crystal display of claim 1, wherein the liquid crystal display cell and the back light module are sandwiched between the first frame and the second frame.

8. A liquid crystal display, comprising:
   a liquid crystal display cell;
   a back light module joined with the liquid crystal display cell;
   a first frame holding the back light module and comprising at least one first locking mechanism including a holding part with an opening extending therethrough; and
   a second frame on the liquid crystal display cell;
   at least one fixing member horizontally and outward extending from the second frame;
   wherein the fixing member pierces through the opening to be held by the holding part.

9. The liquid crystal display of claim 8, wherein the fixing member is an L-shaped extension on the second frame.

10. The liquid crystal display of claim 8, wherein the fixing member is a zigzag-shaped extension on the second frame.

11. The liquid crystal display of claim 8, wherein the first locking mechanism further comprises a recess.

12. The liquid crystal display of claim 11, wherein the fixing member further comprises a bent part against the recess.

13. The liquid crystal display of claim 12, wherein the bent part is a barb against the recess.

14. The liquid crystal display of claim 8, wherein the opening is a fitting hole, a slit, a slot, a concave or an aperture.

15. The liquid crystal display of claim 8, wherein the second frame further comprises at least one sidewall surrounding the first frame.

16. The liquid crystal display of claim 8, wherein the liquid crystal display cell and the back light module are sandwiched between the first frame and the second frame.

17. A liquid crystal display, comprising:
   a liquid crystal display cell;
   a back light module joined with the liquid crystal display cell;
   a first frame holding the back light module and comprising at least one first locking mechanism including a holding part with an opening extending therethrough and a recess; and
   a second frame on the liquid crystal display cell;
   at least one fixing member outward extending from the second frame and including a bent part and a barb extending from the bent part;
   wherein the bent part is disposable through the opening and the barb is against the recess.

18. The liquid crystal display of claim 17, wherein the opening is a fitting hole, a slit, a slot, a concave or an aperture.

19. The liquid crystal display of claim 17, wherein the second frame further comprises at least one sidewall extending surrounding the first frame.

20. The liquid crystal display of claim 17, wherein the liquid crystal display cell and the back light module are sandwiched between the first frame and the second frame.

* * * * *